United States Patent [19]
Valdés et al.

[11] Patent Number: 6,025,851
[45] Date of Patent: Feb. 15, 2000

[54] ENVOLVENT APPROXIMATION USING ACCURATE SLOPE INFORMATION

[75] Inventors: Jacobo Valdés, Palo Alto; Eduardo Martínez, Los Altos, both of Calif.

[73] Assignee: Ductus Incorporated, Mountain View, Calif.

[21] Appl. No.: 09/007,971

[22] Filed: Jan. 16, 1998

Related U.S. Application Data

[60] Provisional application No. 60/035,617, Jan. 17, 1997.

[51] Int. Cl.⁷ ..................................................... G06F 15/00
[52] U.S. Cl. ............................................................. 345/442
[58] Field of Search .................................. 345/442, 441, 345/440, 474, 117, 121

[56] References Cited

U.S. PATENT DOCUMENTS

| | | | |
|---|---|---|---|
| 5,940,064 | 8/1999 | Kai et al. | 345/442 |
| 5,949,435 | 9/1999 | Brock et al. | 345/468 |
| 5,960,160 | 9/1999 | Clark et al. | 382/243 |

*Primary Examiner*—Phu K. Nguyen
*Attorney, Agent, or Firm*—Philip H. Albert; Townsend and Townsend and Crew LLP

[57] ABSTRACT

A trajectory and a footprint of a hypothetical pen are each divided into sequences of segments, each segment having a slope associated therewith. The segments of the footprint form a closed sequence and those of the trajectory form a sequence with a beginning and an end. Each of the two approximate envolvents of the thick line are calculated in the same way, from the trajectory segments and the footprint segments. An envolvent is initialized to include the first segment of the trajectory starting at an appropriate offset from the trajectory start point, followed by zero or more footprint segments and then followed by the next trajectory segment until each of the trajectory segments are concatenated. In determining how many footprint segments to concatenate before concatenating the next trajectory segment, the slopes of the last concatenated trajectory segment and the next trajectory segment are compared to the slopes of the footprint segments. If any footprint segments have slopes between the slopes of the last and next trajectory segments, those footprint segments are concatenated before the next trajectory segment is concatenated. The selection of one of the two sets of footprint slope vectors, either the clockwise set or the counterclockwise set, determines which envolvent of the two envolvents are generated.

15 Claims, 12 Drawing Sheets

ENVOLVENT APPROXIMATION USING ACCURATE SLOPE INFORMATION

CROSS REFERENCE TO RELATED APPLICATIONS

This application claims priority of U.S. Provisional Patent Application Ser. No. 60/035,617 filed Jan. 17, 1997, now expired which is incorporated by reference herein for all purposes.

BACKGROUND OF THE INVENTION

The present invention relates to the field of computer graphics. More specifically, the present invention provides for efficient rendering of thick line primitives in a graphics system.

Rendering is the process of converting a description of a graphics object from a mathematical object description to a raster description usable to control a raster device.

A raster device is a device which displays images by displaying a rectangular array of uniformly spaced picture elements, or pixels, where a pixel is the smallest element of the raster device which can be addressed independently. Each pixel in the raster device's output can be made to take on a color selectable from the raster device's palette, where the palette defines a list of available colors. For many raster devices, the spacing of pixels and the palette might be fixed for a given image, but is changeable from image to image. A raster device can display an image of virtually any two-dimensional pattern, such as a line, a circle or a photograph, by appropriately coloring a set of pixels to suggest to a viewer the desired pattern. This flexibility has made raster devices the preferred visual output medium in computers and consumer products. Examples of raster devices include facsimile machines, video game displays, laser printers and computer monitors.

Rendering a shape is the process of converting a mathematical description of a shape to a collection of pixels (more precisely, pixel values) which approximate the shape. Rendering maps the coordinates of the mathematical description to the space of the pixels' coordinates and selecting those pixels that fall completely inside the shape or sufficiently so to merit inclusion in the raster representation. Rendering is expensive computationally and performed frequently so efficient methods of rendering common shapes are desirable.

In many applications, the mathematical descriptions of objects need to be rendered to pixel descriptions very quickly. The general solution to rendering is to describe the objects to be rendered in terms of their coordinates in a coordinate plane (or a coordinate space for three-dimensional images), map the pixel array to that same coordinate plane, and identify pixels which are closest to the edge of the object's edge. As is known in the art of rendering, actual rendering is slightly more complicated, as specific solutions may need to take into account shading, aliasing effects and other distortions caused by the quantization of mathematical descriptions of objects to fit the constraints inherent in a pixelated display.

Mathematically, a true line has no thickness. A line without thickness can be easily rendered by mapping the line to the coordinate space and identifying the pixels closest to the line in the coordinate plane. By contrast, a thick line has a finite, nonzero thickness. Of course, when rendering a line of zero width, the result is not a zero width line, but a line of a minimum thickness (usually, one pixel wide). As used herein, the term "thick" simply means that the line has a finite, nonzero thickness, to distinguish a line from a "thin" line, which refers herein to a line of zero width. When referring to the relative thickness of thick lines, the terms "heavy" and "light" are used.

One problem not easily solved in rendering systems is the quick and accurate rendering of "thick" lines, which is quite different and considerably more difficult than that of rendering thin lines. Many suitable methods for rendering thin lines are known in the art of rendering which cannot be easily adapted to generate visually accurate thick lines efficiently.

Thick lines are often needed in an image to convey information in addition to the information conveyed by the path of the line. In many graphic designs, such as maps and blueprints, the thickness of a line conveys a great deal of information, such as whether a road is paved, or whether the line represents a wall or a wire. Many other graphics systems require accurate presentation of thick lines, such as mechanical design systems and geographic information systems (GIS).

Mathematically, a thick line can be described as the set of points touched by a pen dragged along a trajectory. The pen can be defined as a region bounded by a convex closed curve (the pen's "footprint") and the pen's "contact point". The pen's contact point is generally, but not necessarily, within the footprint. The trajectory is a continuous, open curve having a starting point and an end point, the starting and ending points defining an implicit direction for the trajectory. Thus, a thick line shape to be rendered is defined as the shape swept out by dragging the contact point of the pen along the trajectory, carrying the footprint along, usually without changing the footprint's orientation. The mathematical thick lines thus described are used to model the marks made by writing instruments such as pens or pencils on paper or other writing surfaces.

FIG. 1 is a graphical view of a thick line 10, which is defined by a trajectory 12 and a "pen" having a contact point 13 and a footprint 14 (which happens to be a circular footprint). The resulting image of thick line 10 is the shape 15 bounded by borders 16. As shown, trajectory 12 has a start point 17 and a direction indicated by an arrowhead 18, and an end point 19. If thick line 10 were to be manually drawn on a sheet of paper, the drafter could do so by dragging a circular pen having footprint 14 over trajectory 12 from start point 17 to end point 19 in direction 18. Of course, the exact same line can be drawn by dragging the pen from end point 19 to start point 17. In other words, the selection of direction 18 over its opposite is arbitrary. However, when implemented using a computer which processes instructions in serial order, one of the directions needs to be specified.

FIG. 1 depicts a particular case of the general problem faced by computer graphics systems in drawing thick lines. In this particular case, the footprint is circular, the thick line is an unpatterned line (a "patterned line" might comprise a pattern of "on" and "off" segments), and the trajectory is smooth (i.e., it has no tangential discontinuities such as kinks or corners). In the more general case, footprint 14 might be replaced with a radially asymmetric convex shape such as an ellipse, an oval or any other closed convex curve or the trajectory might be more complicated.

Many computer graphics systems render a thick line described by a footprint, contact point and trajectory by the simpler process of rendering one or more regions enclosed by closed boundaries. In FIG. 2, a thick line 20 is represented by a collection of regions 21 delimited by closed boundaries 22. Two such collections 24, 26 are shown in FIG. 2. Different collections result from different operating parameters, such as the desired approximation accuracy, the efficiency with which the closed regions can be computed, the number of closed boundary elements needed to represent a given thick line and the nature of the elements used to represent the thick line (polygons or more general shapes). All such methods, however, have to contend with the basic problem of computing, either exactly or approximately, the boundaries that bound the two sides of the thick line from a description of the pen's footprint, orientation and trajectory. These boundaries are referred to as the "envolvents" of the thick line. Once the envolvents of a thick line are determined, the shading of the thick line can proceed using conventional methods used for filling bounded shapes. For an example of envolvents, refer to the boundary 16 shown in FIG. 1.

FIG. 3 illustrates the general approach to calculating envolvents. A portion of a thick line 30 is defined by a footprint 31, a trajectory 32 and a contact point 33. The result sought is the paths of the envolvents 34, 35. Envolvents 34, 35 have been assigned directions as shown by arrowheads 36 according to an arbitrary rule that the left envolvent (as viewed in the direction of travel) is given the same direction as the trajectory and the right envolvent is given the opposite direction. A person skilled in computer graphics would understand that by joining the ends of the envolvents in an appropriate manner, one can form a closed boundary (itself a trajectory) enclosing all the points that are part of thick line 30.

Thus, the problem of rendering a thick line can be reduced to two steps, one of determining the envolvents and one of rendering the shape defined by the continuous closed curve formed by the envolvents with their assigned directions and the curves used to connect their endpoints, under a nonzero winding rule.

As shown in FIG. 3, the envolvents might be more complex curves than the trajectories and footprints from which they arise. Envolvent 34, in particular, illustrates that envolvents may exhibit tangent discontinuities even when the trajectory and the footprint do not.

Where only one envolvent is to be generated, computational complexity is not an issue. However, where many envolvents must be generated quickly, such as in rendering text or rendering a map with many thick lines of varying thicknesses and trajectories, a computationally efficient method or apparatus for generating envolvents from a trajectory, footprint and contact point is needed.

SUMMARY OF THE INVENTION

The present invention provides for efficient calculation of envolvents by accounting for slopes of tangents for a trajectory and a footprint. In one embodiment of a process according to the present invention, a trajectory and a footprint of a hypothetical pen are each divided into sequences of segments, each segment having a slope associated therewith. The segments of the footprint form a closed sequence and those of the trajectory form a sequence with a beginning and an end. Each of the two approximate envolvents of the thick line are calculated in the same way, from the trajectory segments and the footprint segments. An envolvent is initialized to include the first segment of the trajectory starting at an appropriate offset from the trajectory start point, followed by zero or more footprint segments and then followed by the next trajectory segment (and possibly other footprint segments) until each of the trajectory segments are concatenated. In determining how many footprint segments to concatenate before concatenating the next trajectory segment, the slopes of the last concatenated trajectory segment and the next trajectory segment are compared to the slopes of the footprint segments. If any footprint segments have slopes between the slopes of the last and next trajectory segments, those footprint segments are concatenated before the next trajectory segment is concatenated. The selection of one of the two sets of footprint slope vectors, either the clockwise set or the counterclockwise set, determines which envolvent of the two envolvents are generated. After one envolvent is generated, the other can be generated by selecting the other set of footprint slope vectors.

So that the possibility of having to add footprint segments before the first trajectory segment or after the last trajectory segment need not be considered, the trajectory is segmented with a zero length "pseudo-segment" on each end. The slope of a pseudo-segment is set to the slope of the trajectory at that point.

In a computing system, concatenation might be merely the manipulation of list entries, but graphically, concatenation is the process of translating the concatenated segments so that its starting point coincides with the ending point of the last concatenated segment.

The resulting approximate envolvent is the sequence of segments which contains all the trajectory segments in the same order in which they appear in the trajectory, with zero or more footprint segments inserted between each pair of consecutive trajectory segments so as to minimize the change of slope between consecutive segments of the approximate envolvent being assembled. With a convex footprint, where more than one footprint segment is being concatenated between two trajectory segments, those footprint segments will represent a contiguous section of the footprint.

The slopes used for the slope vectors are the slopes of the original curve rather than the distorted slopes of a polygonal approximation to the trajectory. Since mathematical expressions are used to represent the trajectory, the footprint and their segments, the operation of concatenation, which is actually an operation of translation, is easily performed on the mathematical expressions using conventional graphics manipulation techniques.

Segment size is determined by a trade-off between the required accuracy and the available computing power. In most cases, the segment sizes need not be smaller than the pixel spacing of the display for which the thick line is being rendered. In various embodiments of the present invention, the segmentation of the footprint and the trajectory may be performed ahead of time or new segments of both may be generated as they are needed.

The present invention works with continuous trajectories and footprints, as well as trajectories and/or footprints which are represented by possibly discontinuous sequences of curves. The present invention is not restricted to any particular type of curve and will work with most classes of curves which can be either sampled or divided into segments as required, which is satisfied by most computer graphics systems currently in use. Preferably, the data structures used to represent segments and slopes are such that comparison of trajectory and footprint segment slopes can be done without reference to computationally expensive trigonometric calculations.

In addition to efficient computation, the present invention provides a mechanism for easily balancing the need for computational efficiency against the accuracy with which the rendered shape approximates the ideal shape of the thick line.

DESCRIPTION OF THE PREFERRED EMBODIMENT

A method of generating envolvents from a trajectory and a footprint according to the present invention will now be described. The examples below show an open trajectory (i.e., one which does not close on itself) which has a defined direction. It should be apparent from this disclosure that the method described here will work for closed trajectories and the same results will be reached regardless of the direction. The method described below assumes that the footprint is convex, constant and held (for noncircular footprints) in a constant orientation. The method also assumes a continuous trajectory for an unpatterned line. More complex methods are needed where these conditions are not met.

Figure 1:
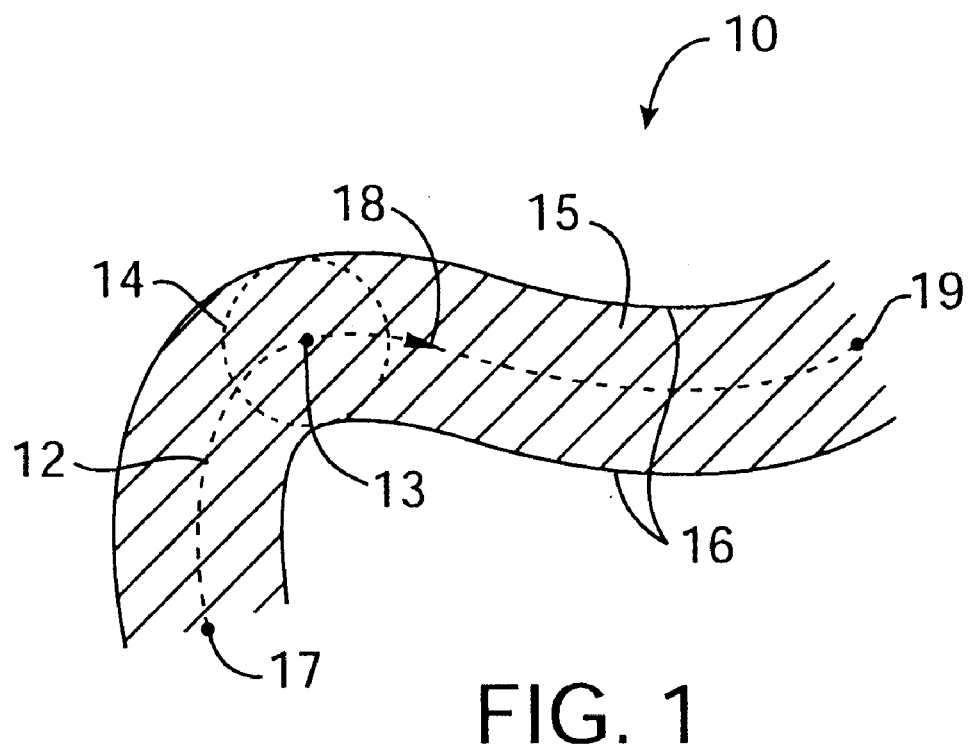
FIG. 1 is a graphic of a thick line defined by a trajectory and a footprint.
Figure 2:
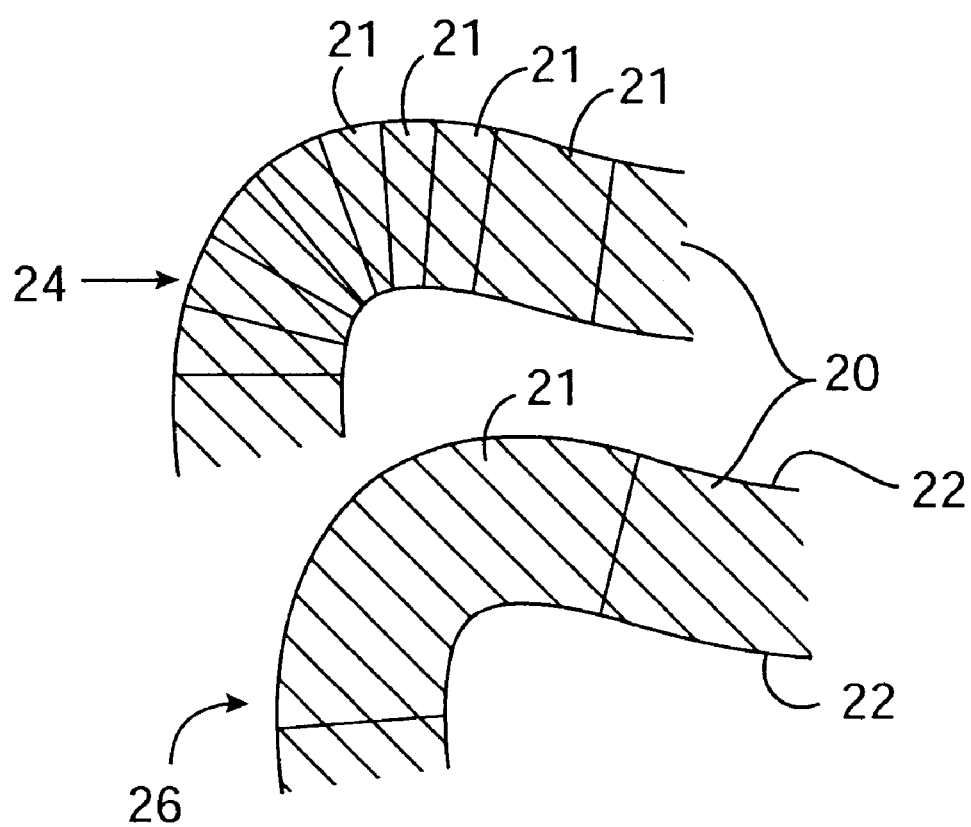
FIG. 2 is a graphic of a thick line decomposed into segments.
Figure 3:
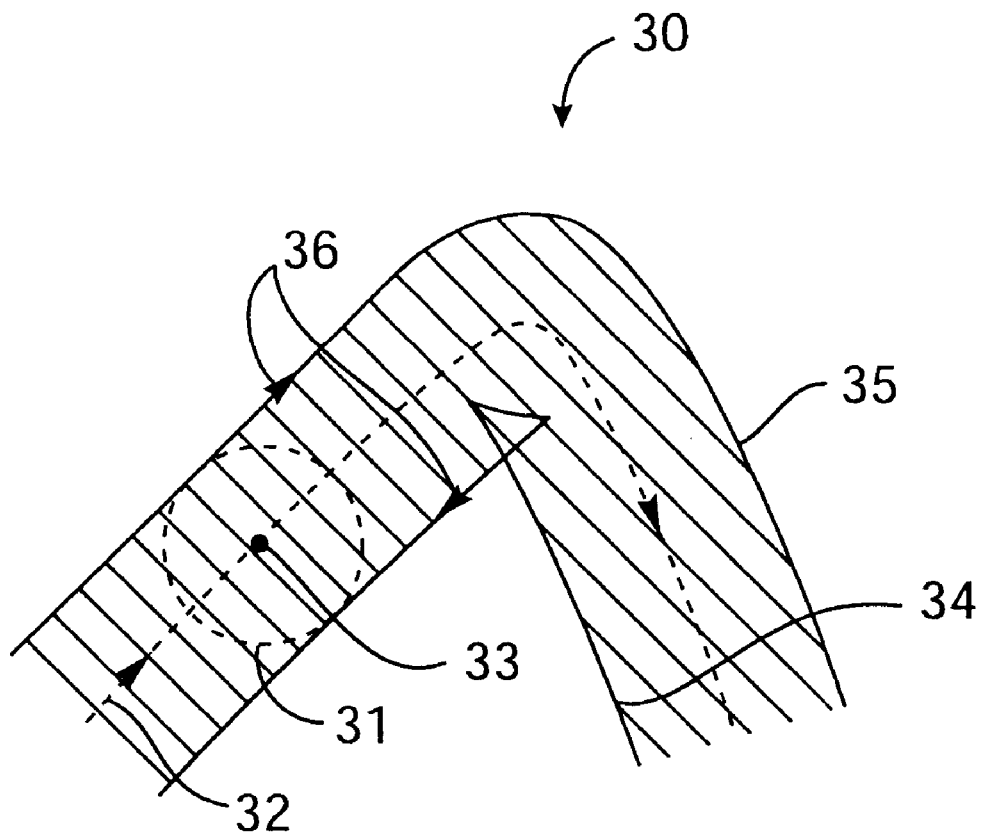
FIG. 3 is a graphic showing how envolvents of a thick line are used to define a thick line object from a trajectory and a footprint, and showing how envolvents can be more complex curves than the trajectory or footprint.
Figure 4:
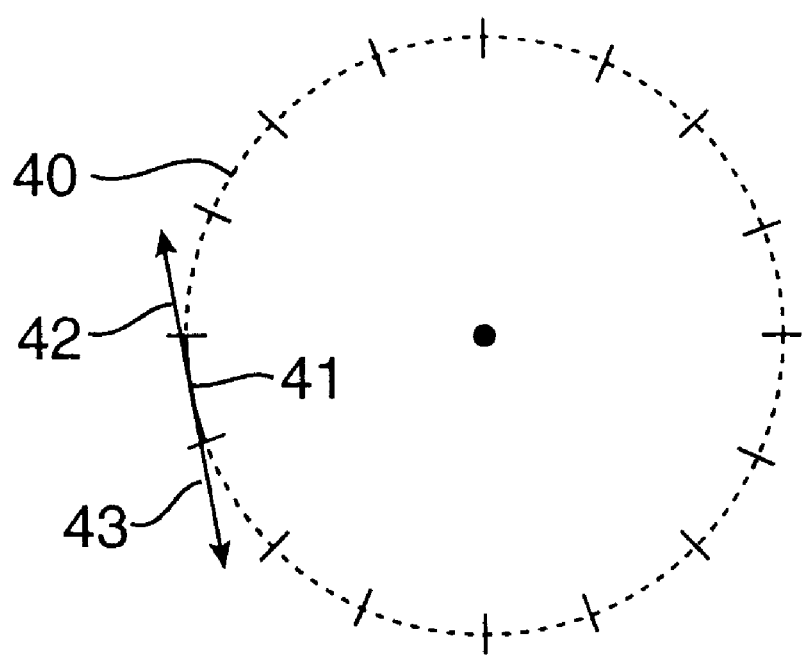
FIG. 4 is a graphic showing one way to divide a footprint into segments, where the segments form a closed curve representing the footprint.

FIG. 4 illustrates how a pen footprint such as footprint 40 might be divided into segments. Footprint 40 is divided into a segment 41 and fifteen other similar segments. The segments need not be equal segments, but in this case they happen to be equal. The actual number of segments used would depend on the amount of computing power available and the resolution of the display for which the thick line is being rendered. Segments on the order of the interpixel distance of the display are usually sufficient for most applications.

The slope of segment 41 (at a suitable midpoint, if curved) is used in the envolvent generation process. This slope is represented by vectors 42, 43, where vector 42 points in a clockwise direction and vector 43 points in a counterclockwise direction, 180 degrees from vector 42. Vector 42, and its counterparts for other footprint segments, are referred to herein as the "clockwise slope vectors, while vector 43 and its counterparts are referred to as the "counterclockwise" slope vectors. The two approximate envolvents for the trajectory and footprint combination are computed by a common iterative process, the only difference being which set of slope vectors are used.

Figure 5:
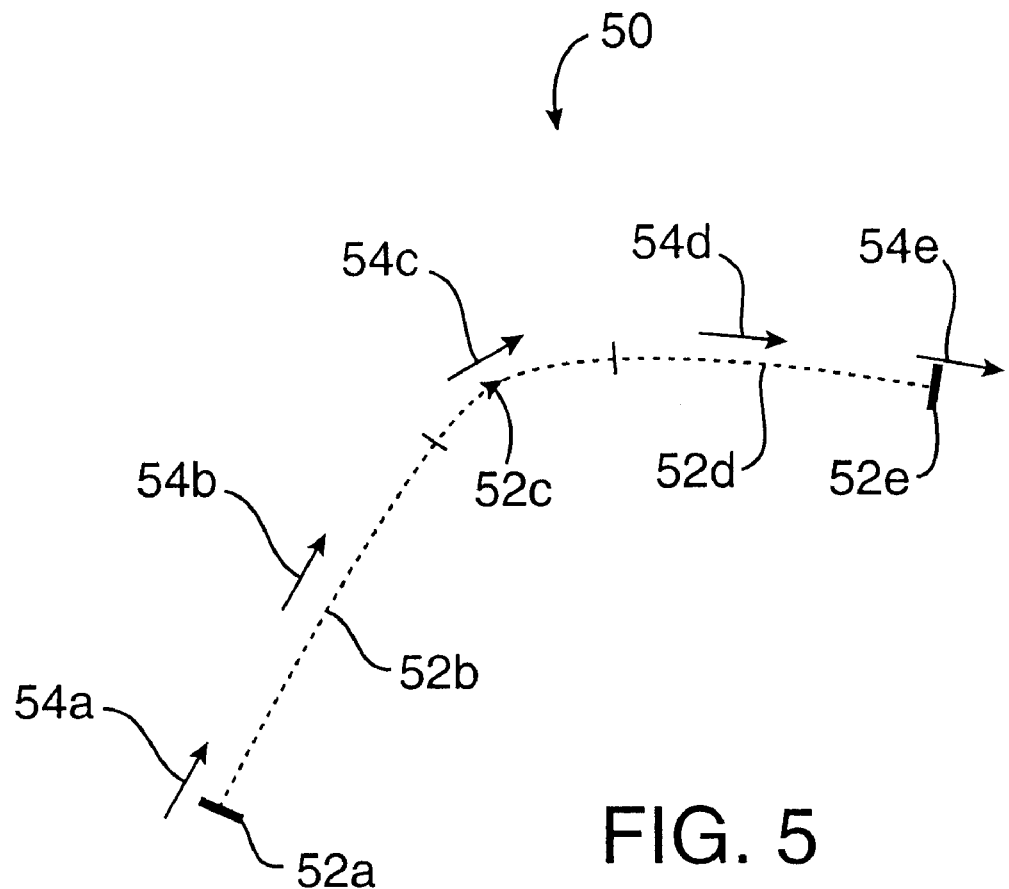
FIG. 5 is a graphic showing one way to divide a trajectory into segments.

FIG. 5 illustrates the division of a trajectory 50 into segments 52a–e. Each of the trajectory segments has a corresponding slope 54a–e. Since trajectories have an assigned direction, only one tangent vector (the one in the direction of travel) is used. The accuracy of the slope vectors is especially important, since only one slope value (and its opposite, in the case of footprints) is chosen for a segment. Consequently, in some embodiments, the segments are selected such that a region of great slope variance is segmented into more segments than a smoother region so that each segment sweeps through a limited range of slopes, preferably surrounding the slope vector chosen for the segment.

Segments 52a and 52e are pseudo-segments, used to simplify computations at the trajectory ends. Segment 52a has a zero length and slope equal to the slope of the trajectory at the start point and segment 52e has a zero length and a slope equal to the shape of the trajectory at the end point. As explained below, these pseudo-segments avoid the need for special processing at the trajectory ends.

Except in very unusual situations, the direction of the trajectory is arbitrarily selected from the two obvious choices and the result is the same either way. In some environments, the trajectory direction is selected to be the same each time (e.g., left to right, bottom to top).

In order to calculate an envolvent quickly, the curves representing the footprint and the trajectory are often approximated by polygons or straight line segments and all computations are performed on those approximations without referring back to the more complicated mathematical expressions for the actual footprint and trajectory. To further conserve computing resources, the ends of the segments are rounded to intersections on a grid of limited resolution (usually a grid of pixel or subpixel spacing). To minimize the effects of these errors, in the preferred embodiment, the slopes of the segments are calculated prior to any rounding or quantization which might be done on the segments.

Figure 6:
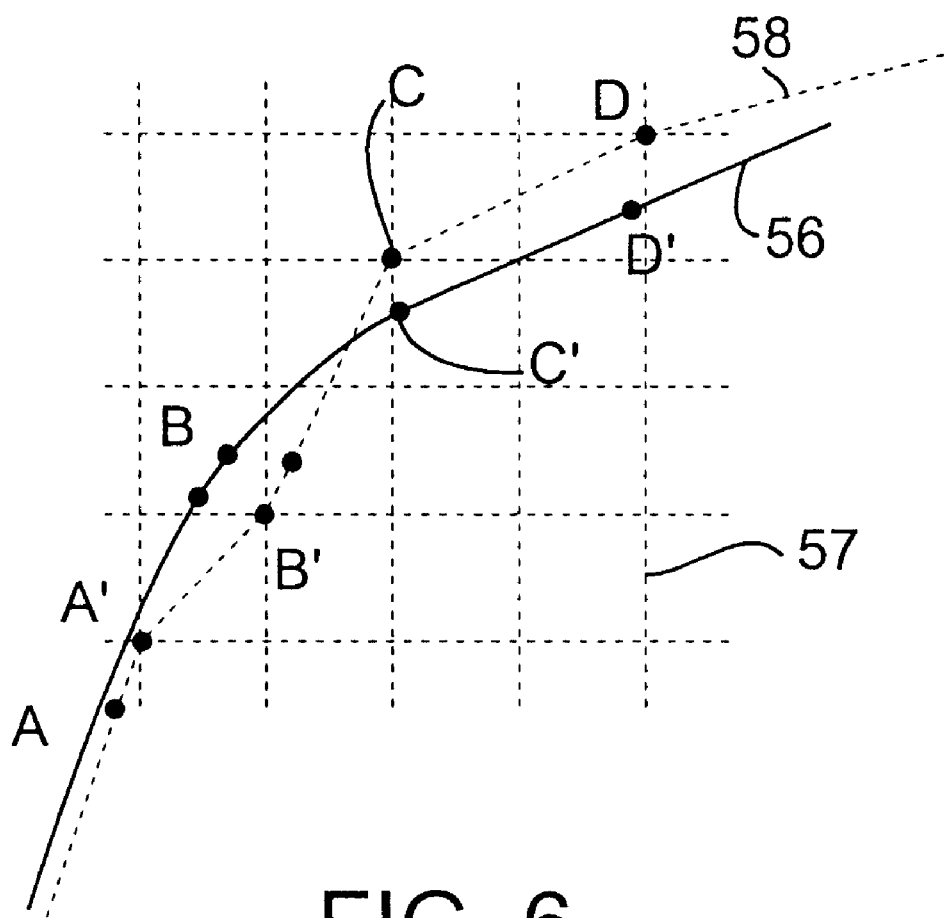
FIG. 6 is a graphic representing a coordinate plane and a grid upon which a curve is approximated by a polygonal line with its attendant position and slope errors.

The reason for this can be seen from FIG. 6. As shown therein, a curve 56 is segmented into segments AB, BC, CD, etc. Those segments are then approximated and rounded so that they are straight line segments and their end points are on intersections of grid 57, forming a curve 58. The rounding moves points A, B, C and D from curve 56 to points A', B', C' and D' on curve 58. If the slopes of the segments were taken after the approximations, the slopes would be not at all close to the slopes of the original curve, even though curve 58 approximates curve 56 well enough. For example, the slope of segment BC is about 45 degrees, while the slope of its approximation, B'C', is about 60 degrees. To avoid these errors, the slope vector assigned to B'C' is the slope of curve 56 at some point between points B and C, even though it is not equal to the slope of the line segment B'C'. Of course, the value of the slope might be rounded to some finite resolution, such as an 8-bit resolution, which is much less drastic than taking the slope from the approximation of the segment. The slope of segment BC can be calculated from the mathematical expression describing curve 56.

This treatment of slopes is particularly useful where the footprint is a convex curve. With accurate slope information, the slopes of the approximation of the footprint define a convex approximate footprint, even if the approximation to the footprint is not quite convex everywhere. Using accurate slope information also confirms the intuitive idea that a larger number of samples leads to a better approximation of the curve. If accurate slopes are not taken into account, a dilemma arises in that using a small number of samples to generate the polygonal approximations leads to poor position approximation (there may be points of the curve that will be far from any point in the polygonal approximation) but using a large number of samples makes the slopes of the lines in the polygonal approximation very different from the slopes of the original curve.

Figure 7:
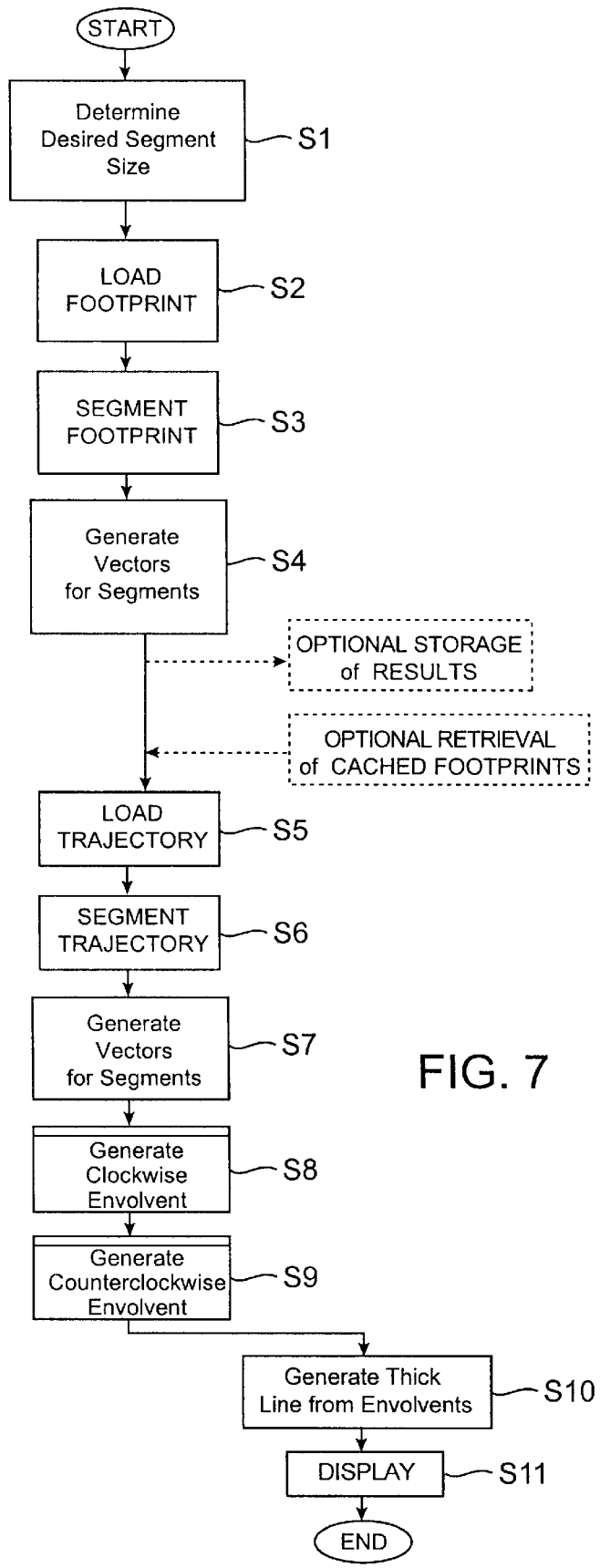
FIG. 7 is a flowchart showing the steps of a process for generating thick lines according to the present invention.
Figure 8:
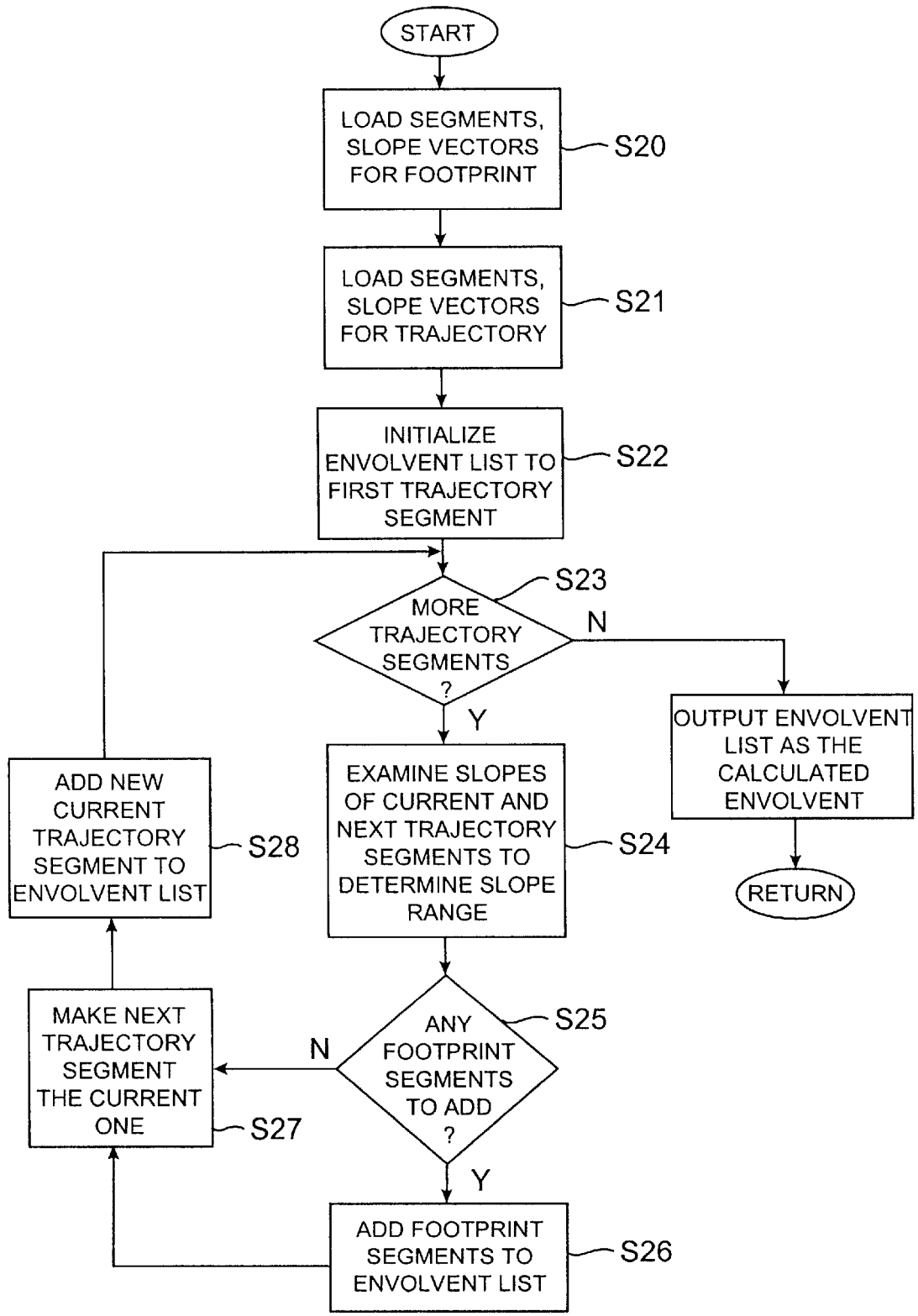
FIG. 8 is a flowchart showing the steps of a process for generating envolvents for use in the thick line generation process of FIG. 7.
Figure 9:
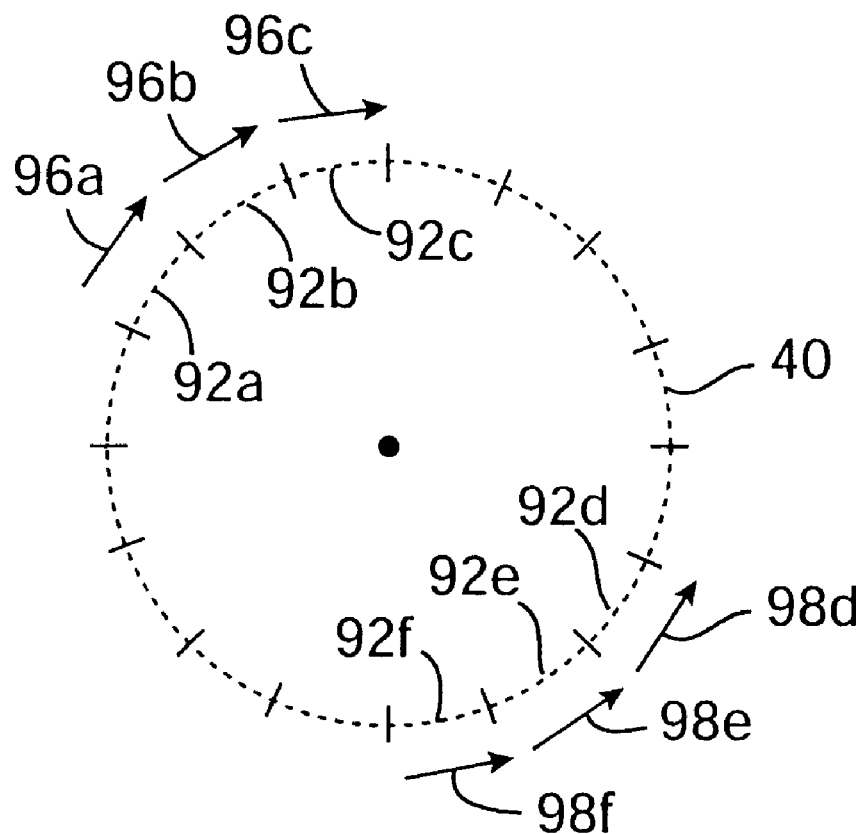
FIG. 9 is a graphic showing one way to divide a footprint into segments.
Figure 10:
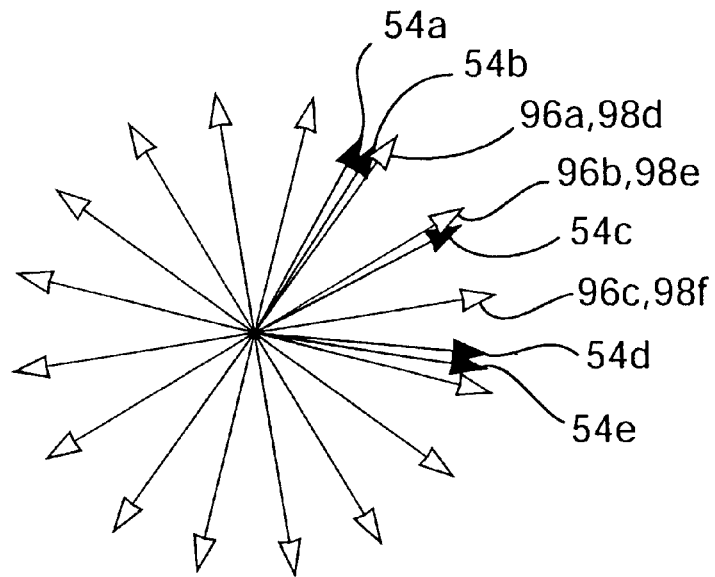
FIG. 10 is a diagram illustrating how footprint segment slopes and trajectory segment slopes are compared by partitioning slopes into a finite number of slope ranges.
Figure 11:
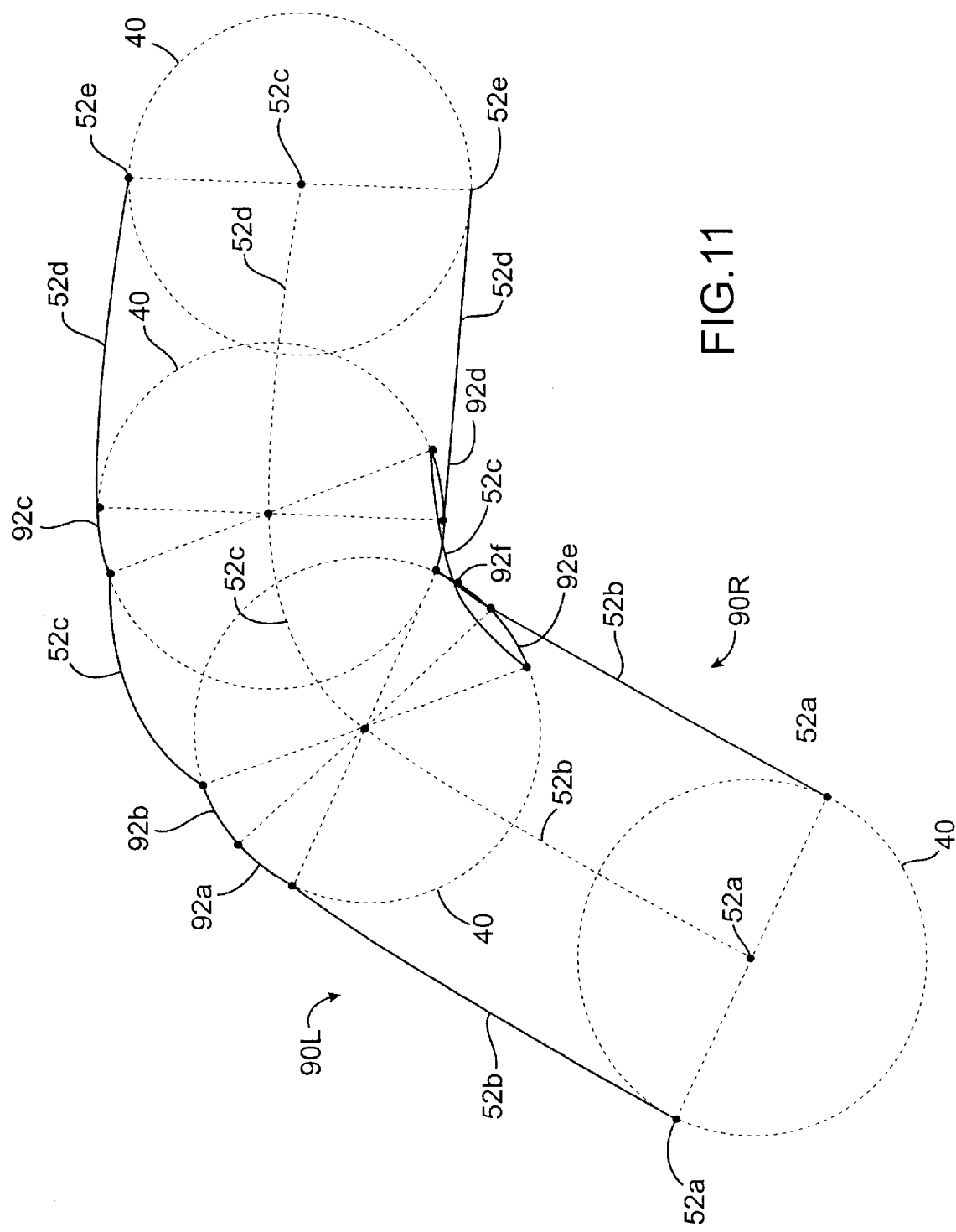
FIG. 11 is a graphic showing two envolvents generated from the footprint of FIG. 9 and the trajectory of FIG. 5.

Referring now to FIGS. 7–11, a process for generating envolvents is shown in the flowcharts of FIGS. 7–8, while FIGS. 9–11 show the results when the process is applied to the footprint of FIG. 4 and the trajectory of FIG. 5 and executed twice, once with the clockwise slope vectors for the footprint and again with the counterclockwise slope vectors of the footprint. In general, the process shown in FIGS. 7–8 is a process of generating an envolvent from the concatenation of an ordered collection of trajectory segments, with zero or more footprint segments "inserted" in between the trajectory segments, where the insertion is a combination of a concatenation and a translation. The resulting approximate envolvent is a sequence of segments containing all the trajectory segments in the same order in which they appear in the trajectory, with footprint segments inserted between the trajectory segments.

The steps of the flowcharts are identified with step numbers (S1, S2, S3, . . . ) and are executed in ascending numerical order unless otherwise indicated. After review of this description, a person of ordinary skill in the art will understand that alternate ordering of some of the steps are possible while still reaching the desired result.

Referring now to FIG. 7, the process begins with a determination of the desired segment size (step S1). The chosen segment size is generally selected based on a trade-off of several constraints, such as the amount of time allotted for the generation of the envolvent, the amount of computing power available and the resolution required. The segment size determined in step S1 might be overridden, as explained below, and might also be different for a footprint and a trajectory.

Once a segment size is decided upon, a footprint is loaded (S2) and segmented (S3). The segments of a footprint might depend on the shape of the footprint. For example, if the footprint is defined by a regular or irregular polygon, the segments might be chosen to coincide with the sides of the polygon. If the footprint is a circle, the segments might be a set of arcs of equal size. In step S4, a clockwise and counterclockwise slope vector is generated for each footprint segment. The point of the segment at which the slope is taken can be the point half the distance along the curve from each endpoint, the midpoint of a parametric function, or any other point on the segment. The midpoint of a parametric function is the point $(x(0.5),y(0.5))$ where the segment is defined by the expression $(x(t),y(t))$ with the start point of the segment being $(x(0),y(0))$ and the end point segment being $(x(1),y(1))$.

As used herein, a slope vector need not be a true vector, i.e. a mathematical concept which specifies a direction and a length, but need only specify a direction. Thus, normal vectors would be suitable constructs. Two slope vectors exist parallel to the tangent, one in each direction. One sequence of slope vectors is labelled the "clockwise sequence" following the conventional notion of clockwise rotation, while the other is labelled the "counterclockwise sequence." If a footprint is to be reused, the segments and slope vectors can be stored for reuse, thus replacing steps S2–S4 with a step of retrieving the segments and slope vectors from storage. Footprints are commonly reused where an entire drawing is to be rendered and the drawing contains many lines of nonzero width which are drawn with the same pen. As described above, the slope vectors are preferably generated before rounding the segments.

In step S5, the trajectory is loaded and in step S6, the trajectory is segmented. As with the footprint, the trajectory can be segmented according to a preferred segment resolution or based on the curve traced by the trajectory. For example, the trajectory shown in FIG. 5 is divided into segments such that a straight region of the trajectory is represented by a single straight segment. To simplify the computing process, a zero length "pseudo-segment" is designated at each end of the trajectory.

Once the trajectory segments are identified, a slope vector is assigned to each segment (S7). While there are two vectors parallel to a tangent, as explained above, only the vector in the direction of the trajectory is used. The trajectory has a particular direction, although the direction may be arbitrary.

After the footprint segments and slope vectors are determined and the trajectory segments and slope vectors are determined, a clockwise envolvent is generated (S8) according to the flowchart shown in FIG. 8 using the trajectory segments, the trajectory and slope vectors, the footprint segments and the clockwise footprint vectors. The counterclockwise envolvent is generated (S9) in the same way, using the counterclockwise footprint slope vectors instead of the clockwise footprint slope vectors. Once the two envolvents are generated, a closed, thick line shape is formed from the envolvents and the shape is rendered by known processes (S10) and, if appropriate, displayed (S11).

It should be apparent that the trajectory can be just as easily segmented before the footprint, although FIG. 7 shows the footprint being segmented first. It should also be apparent that the clockwise envolvent can be assembled before the counterclockwise envolvent as shown in FIG. 7, or they can be assembled in the opposite order.

The details of generating an envolvent using the trajectory segments, trajectory slope vectors, footprint segments and one sequence of footprint slope vectors is shown by the flowchart of FIG. 8. The process begins with the loading of the footprint segments and slope vectors (S20) and the trajectory segments and slope vectors (S21), if not already loaded. These are stored in a list or similar data construct. Then, the envolvent is initialized (S22). The initialized envolvent is set equal to the first trajectory segment (the zero length pseudo-segment, if used). The envolvent might be stored as a list, or similar data construct, with the initialized list having a single entry. The single entry represents the first segment of the envolvent and is a segment which is a translation of the first trajectory segment translated to a point where the origin of the segment is coincident with the origin of the envolvent. The origin of the envolvent is the location of a point on the footprint which has a tangent equal to the tangent of the origin of the trajectory when the contact point of the footprint is coincident with the origin of the trajectory (there are two solutions, one for each envolvent).

Upon initialization, the first trajectory segment is tagged as the current trajectory segment. This can be done using pointers, removal from a list, or any other method known to those of skill in the art of programming. The generation of the envolvent from here is an iterative process, with each trajectory segment in turn being the current trajectory segment, adding to the list of envolvent segments at each iteration. The process is shown in FIG. 8 as steps S23–S28.

At step S23, the trajectory segment list is checked to see if a "next" trajectory segment exists, the next trajectory segment being the segment reached after the current segment when the trajectory is followed. If no next trajectory segment is found, the procedure ends and the envolvent segment list is returned as the envolvent. Unless there is only one trajectory segment, the procedure will not end on the first pass through step S23.

At step S24, the slope vectors for the two trajectory segments meeting at the current joint are examined. The current joint is the intersection of the current trajectory segment and the next trajectory segment. The slope vectors for the footprint segments are compared with the slope vectors of the current trajectory segment and next trajectory segment to determine which footprint segments, if any, are to be added to the envolvent segment list before the next trajectory segment is added (S25).

A footprint segment is added to the envolvent segment list if the slope of the footprint segment is between the slope of the current trajectory segment and the slope of the next trajectory segment. More than one footprint segment is added if more than one has a slope within the range of the trajectory slopes. If the footprint segments form a convex polygon, then all the added footprint segments will be contiguous segments of the footprint. As used in this step, a footprint slope vector is between two trajectory slopes vectors if the angle of the footprint slope is within the smaller of the two angle ranges defined by the trajectory slopes. If the trajectory slope vectors are the same, then the smaller slope range is an empty set and no footprint segments are added to the list of envolvent segments. If the trajectory slopes are exactly opposite, they define two equal 180° slope ranges, and either slope range can be used.

At step S26, the footprint segments, if any are in the range, are added to the list of envolvent segments and then, at step S27, the next trajectory segment is made the current trajectory segment and, at step S28, the new current trajectory segment is added to the list of envolvent segments. The process then repeats at step S13 until there is no new current trajectory segment. The resulting list of envolvent segments form the envolvent curve when the envolvent segments are concatenated in order. Concatenation of segments is graphically shown in FIG. 11. Mathematically, the concatenation of one segment to a partial envolvent is done by translating the segment so that the beginning of the segment is coincident with the end of the partial envolvent. The direction of the tangent vector used determines which end of the footprint segment is the beginning and which is the end. The result is a continuous curve defined by the list of envolvent segments and representing the envolvent for the direction (clockwise or counterclockwise) indicated by the sequence of footprint slope vectors used. If the footprint is convex, then the segments inserted between two trajectory segments change monotonically clockwise or counterclockwise from one trajectory segment to the next.

The results and intermediate calculations of the above-described envolvent generation process are shown in FIGS. 9–11. FIG. 9 shows the division of footprint 40 into segments, such as segments such as segments 92a–f. Footprint 40 happens to be divided into sixteen equal segments, but other divisions might also have been done. A few clockwise slope vectors 96 and counterclockwise slope vectors 96 are shown. For clarity, only the segments and slope vectors (96a–c and 98d–f) which are actually used (see FIG. 11) are labelled in FIG. 9.

FIG. 10 graphically illustrates the process of comparing trajectory and footprint segment slopes. As is apparent from FIG. 10, as far as the clockwise footprint slope vectors are concerned, there are none between trajectory slope vectors 54a and 54b, vectors 96a and 96b fall between vectors 54b and 54c, vector 96c falls between vectors 54c and 54d, and none fall between vectors 54d and 54e. As for the counterclockwise footprint slope vectors, slope vectors 98d–f correspond with vectors 96a–c, respectively. Technically, two vectors merely divide a circle into two regions and a third vector not equal to either of the first two will always be "between" the first two. However, as used herein, "between" refers to common sense notion that the third angle is between the first two if the third angle is within the smaller of the two regions bounded by the first two vectors.

In a sense, the insertion of footprint segments between trajectory segments based on slopes is an attempt to "smooth" out the thick line's outline by matching slopes. By stringing together the slopes in order, the resulting string for the clockwise envolvent would be as follows: 54a-54b-96a-96b-54c-96c-54d-54e, and for the counterclockwise envolvent:

54a-54b-98f-98e-54c-98d-54d-54e.

Listing the segments which correspond to these slopes, the envolvent segment list for the clockwise envolvent is:

52a-52b-92a-92b-52c-92c-52d-52e, and for the counterclockwise envolvent:

52a-52b-92f-92e-52c-92d-52d-52e.

These segments lists are shown graphically in FIG. 11. By convention, the left envolvent 90L is the clockwise envolvent and the right envolvent 90R is the counterclockwise envolvent. In FIG. 11, some artifacts are readily evident, in particular that the approximated envolvents 90L, 90R are bumpy instead of smooth. Smoother approximated envolvents which better match the exact envolvents can be obtained, if desired, by using finer segments in trajectory 50 and footprint 40. It is not without a cost, since finer segments mean more segments, resulting in an increased computational cost. However, if the segments are on the order of pixel resolution, the artifacts will probably not be noticeable. The main reason the artifacts are noticeable in FIG. 11 is that the figure is much larger than an actual thick line being rendered. In a preferred embodiment, trajectories and footprints are segmented into segments on the order of one pixel long, except for straight line segments, which are as long as straight line segments of the trajectory or footprint.

In various embodiments of the invention, the division of the footprint and the trajectory may be performed ahead of time or new segments of both may be generated as they are needed without altering the method in any essential manner as it will be immediately apparent to any person of average skill in computer graphics. Furthermore, although the examples above show the footprint and the trajectory as single curves, the process described above also applies where both the footprint and the trajectory are each represented by a sequence of curves, such as a piecewise linear curve, since the process divides the curves into a segment sequences anyway. After reading this disclosure, it should be apparent to a person of average skill in computer graphics that the above process is not restricted to any particular type of curves and will work with any class of curves that can be either sampled or divided into segments as required, and for which accurate slope information about the segments can be computed efficiently.

Hardware which might be used to perform the above-described processes quickly and efficiently will now be described. The hardware is described in functional form, but it should be apparent that these functional elements can be created as special purpose hardware (typically the fastest implementation) or by programming a general purpose computer (typically the least expensive and implementation). The determination of whether to implement the invention in hardware or software is done according to well-known engineering trade-off analyses. For example, where the invention is to be used as part of a high-end document and graphics processing system, it might be implemented as a software process on a workstation or desktop computer callable by a graphics editing program. However, where the invention is needed to quickly render thick lines on a handheld device such as a portable map viewer, the invention might be implemented as an application-specific integrated circuit (ASIC). Whatever the underlying technology, the system is shown in FIGS. 12–13.

Figure 12:
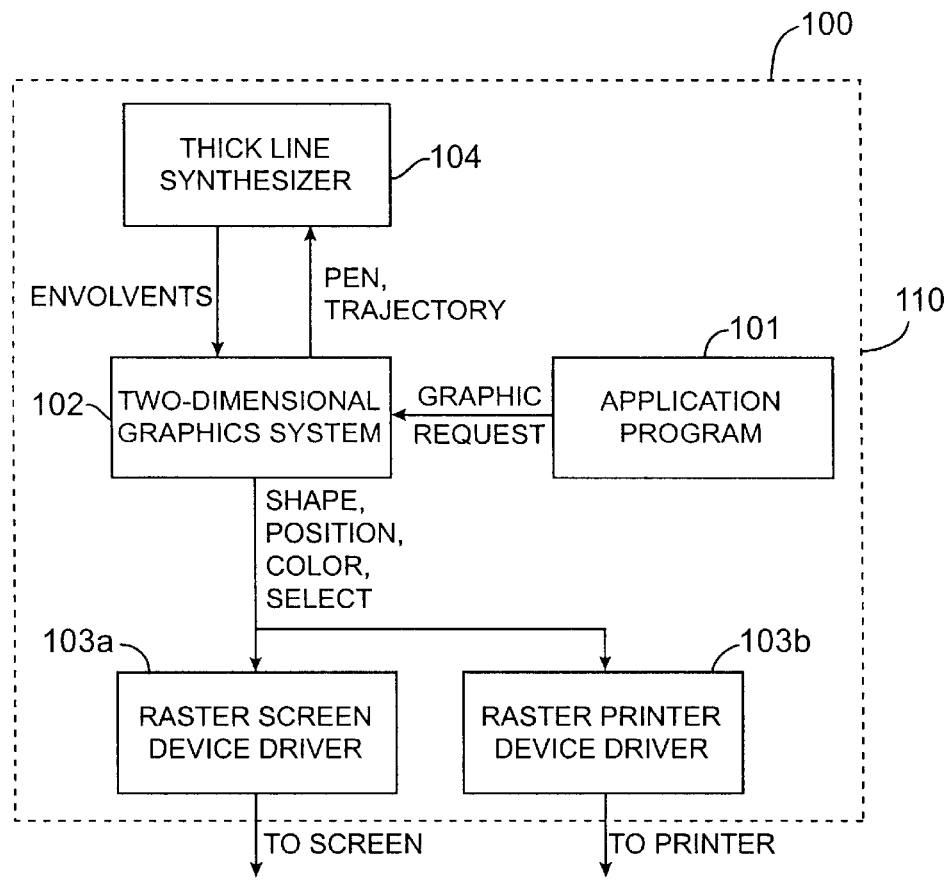
FIG. 12 is a block diagram of a computer system including a thick line synthesizer which renders thick line shapes for display by a raster display device according to the present invention.

FIG. 12 shows a computer system 100 executing an application program 101 which interacts with a graphics system 102 by sending graphics requests to graphics system 102. Where a graphics request is a request to render a thick line, graphics system 102 executes the request with the aid of a thick line synthesizer 104 and outputs the results to device drivers 103a (screen driver) and 103b (printer driver) which generate output for display on raster devices. Graphics system 102 is a two-dimensional graphics system, but the extension of the invention to three or more dimensions is a straightforward extension of the above-described processes.

Graphics system 102 interacts with thick line synthesizer 104 by sending a description of the thick lines it wishes to render, where each such thick line is described by a footprint and a trajectory. Thick line synthesizer 104 responds by computing the approximate envolvents to the thick line thus described.

Figure 13:
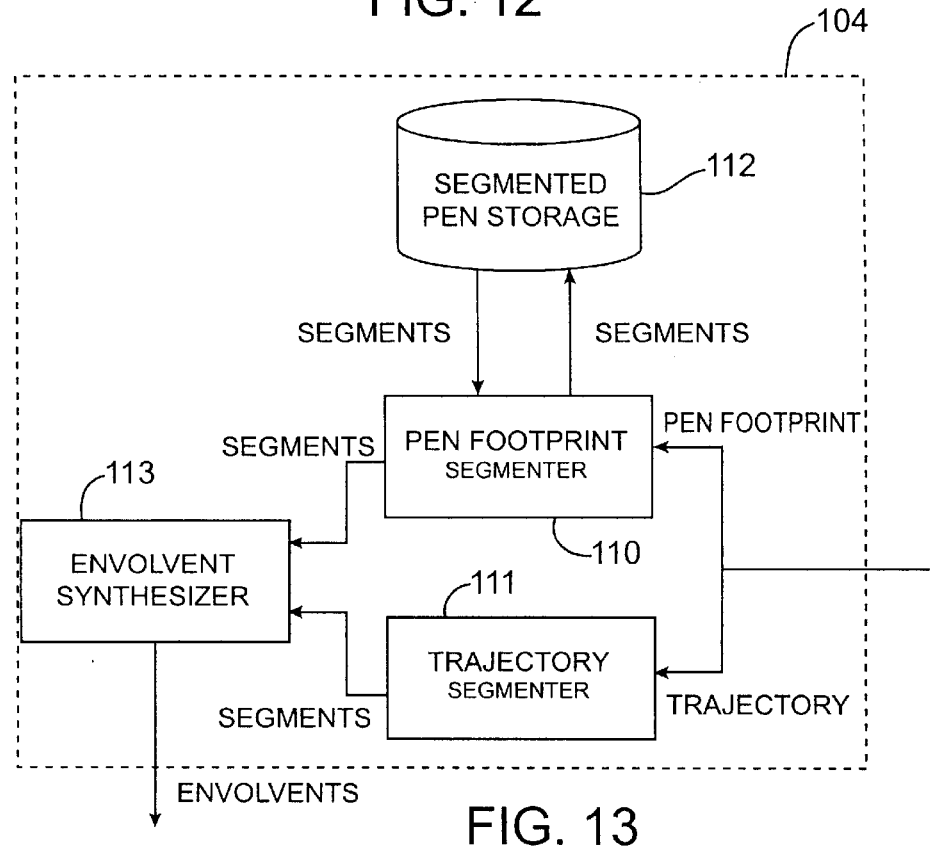
FIG. 13 is a block diagram of the thick line synthesizer shown in FIG. 12.

FIG. 13 is a block diagram showing thick line synthesizer 104 in more detail. Thick line synthesizer 104 has inputs for a footprint and a trajectory and an output for envolvents. The footprint input is coupled to a footprint segmenter 110, which outputs footprint segments and footprint slope vectors to an envolvent synthesizer 113. Footprint segmenter 110 might also store or cache segmented footprints in pen segment storage 112. If a footprint segmentation is stored in pen segment storage 112, footprint segmenter 110 will include logic for identifying footprints which have already been segmented and will pass on the already segmented pen segments rather than recalculating the pen segments. Pen segment storage 112 is useful where many thick lines are being rendered using the same pen, or if a standard set of pens is available.

Most applications only use a small number of footprints. The preferred embodiment also uses this fact to improve the efficiency of the processing by storing the decomposition into segments of all of the footprints used by the application, or at least a number of the ones most recently used. This practice avoids having to decompose a footprint into segments every time it is used, and produces substantial savings when a few footprints are used repeatedly.

The trajectory input is coupled to a trajectory segmenter 110, which outputs trajectory segments and trajectory slope vectors to envolvent synthesizer 113. A store/cache for trajectory segments might also be used, but it would probably not be very useful. If trajectories are reused often, it would be more useful just to store the envolvents and avoid the segmenting problem all together, unless the same trajectories were used over and over with different pen footprints.

In some embodiments, a single segmenting module is used to segment both the trajectory and the footprint. Either way, the segments are provided to envolvent synthesizer 113 which combines the segments together to form the envolvents and outputs the envolvents. In some embodiments, envolvent synthesizer 113 is replaced by two different modules each generating one of the envolvents in parallel. Using two different modules, different segmentations of the trajectory and/or footprint might be used for the clockwise envolvent and the counterclockwise envolvents.

One efficient implementation of the above-described processes uses parametric arcs to represent both the footprint and the trajectory. A parametric arc is defined by two equations, $x(t)$ and $y(t)$, which define a point $(x,y)$ on the arc for every value of the parameter t in a certain range of values. Both the footprint and the trajectory are usually represented as a sequence of several parametric arcs where $x(t)$ and $y(t)$ are polynomials of degree less than four. Parametric arcs defined by polynomials are used to describe trajectories and pens because they are a general enough class of curves to represent efficiently most common shapes and because there are simple and efficient methods for systematically sampling the polynomials used to define them. Sampling is the process of obtaining consecutive values of the polynomials for successive values of the parameter.

For a parametric arc defined by $x(t)$ and $y(t)$, the slope of the tangent is easily calculated. The slope of a tangent to an arc is given by $y'(t)/x'(t)$ where $y'(t)=dy(t)/dt$ and $x'(t)=dx(t)/dt$. Because $y'(t)$ and $x'(t)$ have the same polynomial form as $x(t)$ and $y(t)$, but with smaller degree, the same sampling methods used to obtain points of the arc can be used to obtain accurate information about the slope of the tangents to the arc. Thus, with parametric arcs, an efficient implementation can easily sample the parametric functions to compute polygonal lines approximating the trajectory and the footprint, and can easily sample the first derivatives of the parametric functions to assign a slope to each of the polygonal lines. Note that the slope assigned to a polygonal line so approximated might well be quite different from the slope of the polygonal line, since the slope accurately reflects the slope of the parametric arc, not its approximation. This way, the envolvents will be computed by the process described above using the polygonal lines representing the footprint and trajectory with accurate slopes assigned to each segment. The resulting approximate envolvents will therefore be polygonal lines.

The footprints used in most applications are circles and ellipses, and therefore have central symmetry. In one preferred embodiment, this central symmetry is used to compute the two envolvents simultaneously when the footprint and the resulting set of footprint segments exhibit central symmetry (as is shown in FIG. 4). During the computation of the envolvents, every time a pen segment is inserted in one of the envolvents, the congruent segment in the opposite side of the pen is inserted in the other envolvent, so that the process need not be repeated twice. This could have been done in the example shown in FIG. 11, since the footprint segments there displayed central symmetry.

Figure 14:
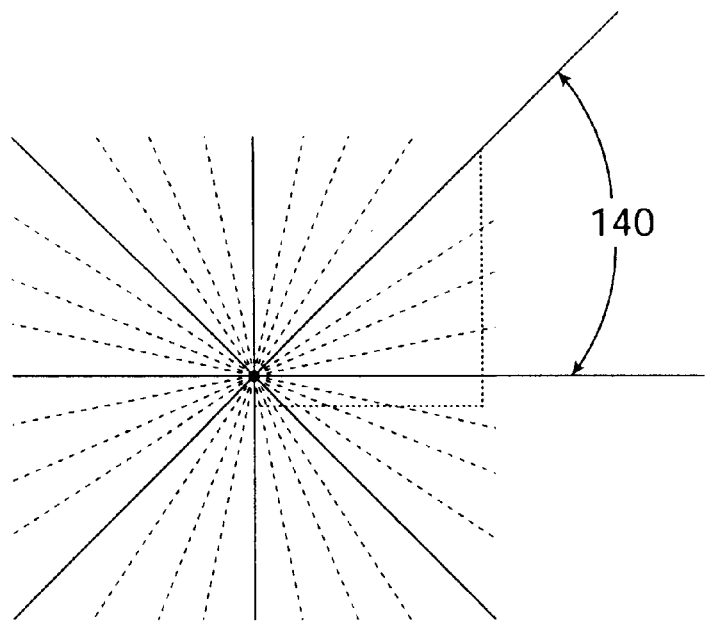
FIG. 14 is a diagram showing how slopes might be quantized for easy comparison.

For the purpose of comparing slopes, one preferred embodiment groups all possible slopes into a small number of slope ranges. This quantization simplifies the manipulation of slopes that needs to be performed during the generation of the approximate envolvents, such as comparing slopes to determine their relative positions and deciding whether a given slope is between two other slopes. Choosing these ranges appropriately simplifies the task of determining which range contains a slope given by the values of x'(t) and y'(t) for some value of t without actually having to calculate the tangent slope. For example, slope quantization might resolve all slopes into one of thirty-two slope ranges as shown in FIG. 14. First, all possible slopes are divided into eight octants such as octant 140. Octant 140 is divided into four slope ranges bounded by the lines with slopes 0/4, 1/4, 2/4, 3/4 and 4/4. With these divisions of slope ranges, slope comparisons only require simple operations. To find which range a slope falls into, the magnitude of the slope and its sign is enough to determine the octant and a single division and rounding is enough to determine the range in that octant into which the slope falls. With each slope rounded to one of thirty-two choices, comparison of slopes can be done quickly.

In many applications, the advantage of quick slope comparison is more than enough to compensate for the inaccuracies introduced by the rounding slopes into ranges which are few in number and nonuniform in size. If thirty-two slopes are not enough, more slope ranges can be used with only slightly more computation. Experiments show that 128 ranges for each octant (instead of the four per octant shown in FIG. 14) are clearly sufficient for even the most quality sensitive screen-based applications, and far fewer are required for good results in most cases.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of generating an envolvent from a trajectory and a footprint, comprising the steps of:
   segmenting the footprint to form a collection of footprint segments;
   assigning a tangent direction to each footprint segment of the collection of footprint segments;
   segmenting the trajectory into a collection of trajectory segments;
   assigning a trajectory vector to each trajectory segment, wherein a segment join point is defined between each pair of adjacent trajectory segments;
   initializing an envolvent with the collection of trajectory segments;
   inserting, at each segment join point (possible insertion at ends), a footprint segment if the slope of the tangent vector of the footprint segment to be inserted is between the slopes of the trajectory segments which join outside each segment join point; and
   using the trajectory segments with the inserted footprint segments as the envolvent.

2. The method of claim 1, wherein each second tangent vector of a footprint segment is rotated 180° relative to a corresponding first tangent vector for said each footprint segment.

3. The method of claim 1, wherein the step of segmenting the trajectory into trajectory segments is a step of segmenting linear portions of the trajectory into a single segment for each linear portion of the trajectory.

4. The method of claim 1, where envolvents for multiple lines are generated and at least one footprint is reused for more than one of the multiple lines, the method further comprising a step of saving the at least one footprint for reuse with multiple lines.

5. A method of rasterizing a line of nonzero thickness which can be described by a trajectory and a footprint of nonzero area, the method comprising the steps of:
   defining a pixel grid which maps points on the pixel grid to pixels of a raster display device;
   defining a coordinate plane onto which the pixel grid and a line being rasterized can be mapped;
   segmenting the footprint to form a collection of footprint segments;
   assigning a first tangent vector to each footprint segment of the collection of footprint segments;
   assigning a second tangent vector to each footprint segment of the collection of footprint segments, the second tangent vector for a given footprint segment being a vector in a direction opposite the first tangent vector for the given footprint segment;
   segmenting the trajectory into a collection of trajectory segments, wherein a segment join point is defined between each pair of adjacent trajectory segments;
   assigning a trajectory vector to each trajectory segment;
   initializing a first envolvent with the collection of trajectory segments;
   inserting, at each segment join point, a footprint segment if the slope of the first tangent vector of the footprint segment to be inserted is between the slopes the trajectory segments which join at said each segment join point;
   using the trajectory segments with the inserted footprint segments as the first envolvent;
   initializing a second envolvent with the collection of trajectory segments;
   inserting, at each segment join point of the second envolvent, a footprint segment if the slope of the second tangent vector of the footprint segment to be inserted is between the slopes of the trajectory segments which join at said each segment join point;
   using the trajectory segments with the inserted footprint segments as the second envolvent;
   closing the ends of the first and second envolvents, if not already closed, to form a closed curve defining the line of nonzero thickness; and
   rasterizing the closed curve to define a color value for each of a plurality of pixels in the pixel grid to represent an image of the line with the plurality of pixels.

6. The method of claim 5, wherein each second tangent vector of a footprint segment is rotated 180° relative to a corresponding first tangent vector for said each footprint segment.

7. The method of claim 5, wherein the step of segmenting the trajectory into trajectory segments is a step of segmenting linear portions of the trajectory into a single segment for each linear portion of the trajectory.

8. The method of claim 5, where envolvents for multiple lines are generated and at least one footprint is reused for more than one of the multiple lines, the method further comprising a step of saving the at least one footprint for reuse with multiple lines.

9. The method of claim 5, wherein the footprint is defined by a convex, continuous and closed curve.

10. The method of claim 5, wherein the trajectory is a sequence of at least one continuous curve.

11. The method of claim 5, wherein the footprint and trajectory each comprise a sequence of parametric curves.

12. The method of claim 11, wherein the trajectory segments are parametric curves of the same type as the trajectory and the footprint segments are parametric curves of the same type as the footprint.

13. The method of claim 5, wherein the trajectory segments are straight line approximations to the trajectory and the footprint segments are straight line approximations to the footprint.

14. A workstation comprising:
   a raster display, which displays an image using a grid of pixels each colorable with a pixel color assigned to that pixel to suggest said image with the pixels;
   storage means for storing a definition of a trajectory and a definition of a footprint;
   segmenting means, coupled to the storage means, for segmenting the trajectory and the footprint into a sequence of trajectory segments and a sequence of footprint segments, respectively;
   merging means, coupled to the segmenting means, for merging the sequence of trajectory segments and a sequence of footprint segments into an envolvent comprising the sequence of trajectory segments with footprint segments from the sequence of footprint segments interspersed between the footprint segments where tangents to the footprint segments have angles between angles of tangents of adjacent trajectory segments; and
   means for forming an image of a thick line from envolvents generated by the merging means.

15. A computer program product for rasterizing a thick line for input to a raster device, where the thick line is a line described by a trajectory and a footprint of nonzero area, the computer program product comprising:

program code defining a process of segmenting the footprint to form a collection of footprint segments;
   program code defining a process of assigning a first tangent vector to each footprint segment of the collection of footprint segments;
   program code defining a process of assigning a second tangent vector to each footprint segment of the collection of footprint segments, the second tangent vector for a given footprint segment being a vector in a direction opposite the first tangent vector for the given footprint segment;
   program code defining a process of segmenting the trajectory into a collection of trajectory segments, wherein a segment join point is defined between each pair of adjacent trajectory segments, and a process of assigning a trajectory vector to each trajectory segment;
   program code defining a process of initializing first and second envolvents with the collection of trajectory segments;
   program code defining a process of inserting, at each segment join point in the first and second envolvents, a footprint segment if the slope of the first tangent vector of the footprint segment to be inserted is between the slopes the trajectory segments which join at said each segment join point;
   program code defining a process of closing the ends of the first and second envolvents, if not already closed, to form a closed curve defining the thick line;
   program code defining a process of rasterizing the closed curve to define a color value for each of a plurality of pixels in the pixel grid to represent an image of the line with the plurality of pixels; and
   a computer-readable medium on which the program codes are stored.

* * * * *